(12) United States Patent
Powell et al.

(10) Patent No.: US 7,497,384 B2
(45) Date of Patent: *Mar. 3, 2009

(54) METHODS AND SYSTEMS FOR THE NEGOTIATION OF A POPULATION OF RFID TAGS WITH IMPROVED SECURITY

(75) Inventors: Kevin J. Powell, Annapolis, MD (US); Wayne E. Shanks, Baltimore, MD (US); William R. Bandy, Gambrills, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 11/270,778

(22) Filed: Nov. 10, 2005

(65) Prior Publication Data

US 2006/0065731 A1 Mar. 30, 2006

Related U.S. Application Data

(63) Continuation of application No. 10/693,687, filed on Oct. 27, 2003, now Pat. No. 7,195,173.

(60) Provisional application No. 60/421,050, filed on Oct. 25, 2002.

(51) Int. Cl.
*G06K 19/06* (2006.01)

(52) U.S. Cl. .................. 235/492; 235/486; 340/10.1

(58) Field of Classification Search .............. 235/492, 235/375, 382, 486; 340/854.6, 10.1, 10.2, 340/10.3

See application file for complete search history.

(56) References Cited

U.S. PATENT DOCUMENTS

| 3,520,406 | A | 7/1970 | Turner |
| 3,689,885 | A | 9/1972 | Kaplan et al. |
| 4,225,953 | A | 9/1980 | Simon et al. |
| 4,418,411 | A | 11/1983 | Strietzel |
| 4,471,345 | A | 9/1984 | Barrett, Jr. |
| 4,495,496 | A | 1/1985 | Miller, III |
| 4,533,871 | A | 8/1985 | Boetzkes |

(Continued)

FOREIGN PATENT DOCUMENTS

| EP | 0 494 114 A2 | 7/1992 |
| EP | 0 496 986 A2 | 8/1992 |
| EP | 0 578 457 A2 | 1/1994 |
| EP | 0 585 132 A1 | 3/1994 |
| EP | 0 598 624 A1 | 5/1994 |
| EP | 0 615 285 A2 | 9/1994 |
| WO | WO 01/57807 A1 | 8/2001 |
| WO | WO 03/050707 | 6/2003 |

OTHER PUBLICATIONS

International Search Report for Application No. PCT/US03/34036, mailed May 21, 2004.

*Primary Examiner*—Ahshik Kim

(57) ABSTRACT

Methods and systems for the negotiation of a population of RFID tags with improved security is provided. In one aspect, tags are singulated without using information that directly identifies the tags in the tag population. A key is generated to identify each RFID tag of the population of RFID tags. The generated key does not include bits identifying an item with which the particular RFID tag is associated. An algorithm is operated to identify one or more tags in the population of RFIDs tags using the generated keys. In another aspect, frequency hopping and/or spread spectrum techniques are used to provide improved security while negotiating tags. In another aspect, the reader causes the tags to scroll series of bits back to the reader for each bit sent to the tags to provide improved security.

50 Claims, 9 Drawing Sheets

U.S. PATENT DOCUMENTS

| | | | |
|---|---|---|---|
| 4,598,275 A | 7/1986 | Ross et al. |
| 4,636,950 A | 1/1987 | Caswell et al. |
| 4,656,463 A | 4/1987 | Anders et al. |
| 4,862,160 A | 8/1989 | Ekchian et al. |
| 4,931,788 A | 6/1990 | Creswick |
| 5,124,699 A | 6/1992 | Tervoert et al. |
| 5,214,409 A | 5/1993 | Beigel |
| 5,245,534 A | 9/1993 | Waterhouse et al. |
| 5,266,925 A | 11/1993 | Vercellotti et al. |
| 5,289,372 A | 2/1994 | Guthrie et al. |
| 5,313,052 A | 5/1994 | Watanabe et al. |
| 5,339,073 A | 8/1994 | Dodd et al. |
| 5,365,551 A | 11/1994 | Snodgrass et al. |
| 5,390,360 A | 2/1995 | Scop et al. |
| 5,410,315 A | 4/1995 | Huber |
| 5,420,577 A | 5/1995 | Kim et al. |
| 5,430,441 A | 7/1995 | Bickley et al. |
| 5,434,572 A | 7/1995 | Smith |
| 5,434,775 A | 7/1995 | Sims et al. |
| 5,444,223 A | 8/1995 | Blama |
| 5,446,447 A | 8/1995 | Carney et al. |
| 5,478,991 A | 12/1995 | Watanabe et al. |
| 5,489,908 A | 2/1996 | Orthmann et al. |
| 5,499,017 A | 3/1996 | Beigel |
| 5,500,650 A | 3/1996 | Snodgrass et al. |
| 5,515,053 A | 5/1996 | Hecht et al. |
| 5,519,381 A | 5/1996 | Marsh et al. |
| 5,528,222 A | 6/1996 | Moskowitz et al. |
| 5,528,232 A | 6/1996 | Verma et al. |
| 5,537,105 A | 7/1996 | Marsh et al. |
| 5,539,394 A | 7/1996 | Cato et al. |
| 5,539,775 A | 7/1996 | Tuttle et al. |
| 5,541,928 A | 7/1996 | Kobayashi et al. |
| 5,550,547 A | 8/1996 | Chan et al. |
| 5,557,280 A | 9/1996 | Marsh et al. |
| 5,566,441 A | 10/1996 | Marsh et al. |
| 5,576,692 A | 11/1996 | Tompkins et al. |
| 5,583,850 A | 12/1996 | Snodgrass et al. |
| 5,591,951 A | 1/1997 | Doty |
| 5,627,517 A | 5/1997 | Theimer et al. |
| 5,627,544 A | 5/1997 | Snodgrass et al. |
| 5,640,151 A | 6/1997 | Reis et al. |
| 5,646,607 A | 7/1997 | Shurman et al. |
| 5,648,765 A | 7/1997 | Cresap et al. |
| 5,648,767 A | 7/1997 | O'Connor et al. |
| 5,673,037 A | 9/1997 | Cesar et al. |
| 5,680,459 A | 10/1997 | Hook et al. |
| 5,686,888 A | 11/1997 | Welles, II et al. |
| 5,686,902 A | 11/1997 | Reis et al. |
| 5,689,239 A | 11/1997 | Turner et al. |
| 5,774,876 A | 6/1998 | Woolley et al. |
| 5,798,693 A | 8/1998 | Engellenner |
| 5,818,021 A | 10/1998 | Szewczykowski |
| 5,841,770 A | 11/1998 | Snodgrass et al. |
| 5,940,006 A | 8/1999 | MacLellan et al. |
| 5,995,019 A | 11/1999 | Chieu et al. |
| 6,002,544 A | 12/1999 | Yatsu |
| 6,107,910 A | 8/2000 | Nysen |
| 6,177,858 B1 | 1/2001 | Raimbault et al. |
| 6,226,300 B1 | 5/2001 | Hush et al. |
| 6,377,203 B1 * | 4/2002 | Doany ..................... 342/44 |
| 6,397,334 B1 | 5/2002 | Chainer et al. |
| 6,412,086 B1 | 6/2002 | Friedman et al. |
| 6,433,671 B1 | 8/2002 | Nysen |
| 6,531,957 B1 | 3/2003 | Nysen |
| 6,538,563 B1 | 3/2003 | Heng |
| 6,580,358 B1 | 6/2003 | Nysen |
| 6,714,120 B2 | 3/2004 | Blama et al. |
| 6,720,888 B2 | 4/2004 | Eagleson et al. |
| 6,725,014 B1 | 4/2004 | Voegele |
| 6,727,803 B2 | 4/2004 | Hulvey |
| 6,774,766 B1 | 8/2004 | Moyer |
| 6,950,009 B1 | 9/2005 | Nysen |
| 7,035,818 B1 | 4/2006 | Bandy et al. |
| 7,057,511 B2 | 6/2006 | Shanks et al. |
| 7,075,436 B2 | 7/2006 | Shanks et al. |
| 2003/0019929 A1 | 1/2003 | Stewart et al. |
| 2004/0074963 A1 | 4/2004 | Pierce et al. |
| 2004/0135674 A1 | 7/2004 | Shanks et al. |

* cited by examiner

METHODS AND SYSTEMS FOR THE NEGOTIATION OF A POPULATION OF RFID TAGS WITH IMPROVED SECURITY

CROSS-REFERENCE TO RELATED APPLICATIONS

This application is a continuation of U.S. Ser. No. 10/693,687, filed Oct. 27, 2003, now U.S. Pat. No. 7,195,173, which claims priority to U.S. Provisional Application No. 60/421,050 filed Oct. 25, 2002, which are both incorporated herein by reference in their entireties.

BACKGROUND OF THE INVENTION

1. Field of the Invention

The present invention generally relates to radio frequency identification (RFID) tags, and more particularly to secure negotiation of a population of RFID tags.

2. Background Art

In an RFID system, an RFID reader interrogates one or more RFID tags for information. The RFID reader may be required to distinguish between and communicate with a large number of different RFID tags within a given communication range. Typically, a unique identification number identifies each tag. It is important that the RFID reader is capable of quickly and accurately reading the identification (ID) number associated with each tag. In order to interrogate a particular tag, typically, the reader broadcasts the identification number of the tag, in a bit-by-bit fashion, and the tag responds.

However, such RFID systems can suffer from security problems. In a first security problem, a signal transmitted from the reader to a tag may travel a long distance, such as a distance of miles. Thus, when the reader broadcasts a complete tag ID number, an undesired third party can receive this broadcast, and collect this transmitted data. Thus, an undesired third party can obtain the identification number of the tag in this manner.

In a second security problem, an undesired third party can fool or "spoof" an RFID reader into broadcasting the identification number of a tag in order to collect it. For example, in such a situation, the undesired third party responds to broadcasts of a reader. The undesired third party transmits false tag responses to the reader to cause bit collisions that thereby cause the reader to broadcast the identification number bits.

Thus, what is needed is a way of communicating with tags on an open-air communication channel, while protecting tag data, such as the tag identification number.

BRIEF SUMMARY OF THE INVENTION

The present invention provides for secure communications (i.e., negotiations) between readers and tags. According to the present invention, a reader can communicate with tags on an open-air communication channel, while keeping tag data, such as tag identification numbers, secure.

According to embodiments of the present invention, conventional binary traversal algorithms can be modified to provide for secure communications between readers and tags. For example, a conventional binary tree traversal algorithm can be modified to provide for the secure negotiations.

For example, a method of secure negotiation of a population of RFID tags is implemented so that a complete tag number is not transmitted over the air. The steps in the method can include the following: (1) operating a binary tree algorithm to identify an RFID tag in a population of RFIDs tags; (2) receiving bits from one or more of said population of said RFID tags during said binary tree algorithm; and (3) echoing said received bits back to said population of RFID tags only at forks in said binary tree algorithm.

In another aspect, a method of secure negotiation of a population of RFID tags is implemented so that a binary traversal is performed that contains no application data. The steps in the method can include the following: (1) generating a key to identify an RFID tag of the population of RFID tags, wherein the key does not include bits identifying an item with which the RFID tag is associated; (2) operating a binary tree algorithm to identify the RFID tag in a population of RFIDs tags; and (3) receiving bits from the RFID tag during the binary tree algorithm.

In an aspect, the generating step includes the step of selecting a number from a sequence of numbers to use as the key.

In another aspect, the generating step includes the step of using a randomly generated number as the key.

In another aspect, the generating step includes the step of dynamically generating a number prior to each traversal of the population of RFID tags to use as the key.

In another aspect of the present invention, a method and system for a radio frequency identification (RFID) tag to communicate with a RFID reader with improved security is described. The tag stores a corresponding first key, which can be an identification number. The first key comprises a first bit pattern. A first at least one bit is received from the reader to cause the tag to respond to a binary traversal operation with a second key, defined by a second bit pattern. A binary traversal operation is engaged with the reader. During the binary traversal operation, a series of bits are received from the reader, and the tag responds to each bit of the series of bits with a corresponding bit of the second bit pattern. The tag is thereby singulated, using the second bit pattern of the second key.

In aspects, the second bit pattern can be read from storage in the tag.

In another aspect, the bit values for each bit of the second bit pattern can be randomly generated during operation of the tag. In an aspect, the randomly generated second bit pattern can then be stored.

In another aspect, a second binary traversal operation can be engaged with the reader. During the second binary traversal operation, the tag can respond with the stored second bit pattern, or can respond with a newly randomly generated second bit pattern.

In another aspect of the present invention, a radio frequency identification (RFID) tag is described. The tag includes an antenna, a modulator, a first storage, and a second storage. The modulator is coupled to the antenna. The modulator is configured to backscatter modulate bits received from the antenna with response bits. The first storage stores a first bit pattern (i.e., first key) that defines an identification number. The second storage stores a second bit pattern (i.e., second key) that does not include bits identifying an item with which the RFID tag is associated. A first bit combination received from a reader causes the tag to respond to a binary traversal with the first bit pattern. The second bit combination received from the reader causes the tag to respond to a binary traversal with the second bit pattern.

In an aspect, the tag includes a random bit pattern generator for generating the second bit pattern. In one aspect, the generated second bit pattern is stored in the second storage. In an alternative aspect, the generated second bit pattern is not stored, and the second storage is not present. In this aspect, the second bit pattern is transmitted by the tag in a response to the reader as the second bit pattern is generated.

In another aspect of the present invention, a method and system for a radio frequency identification (RFID) reader to communicate with a population of RFID tags with improved security is presented. Each tag in the population stores a corresponding first key, which can be an identification number, and which includes a first bit pattern. A first at least one bit is transmitted to the population of tags to cause tags to respond to a binary traversal operation with a second bit pattern. A substantially constant signal is transmitted to the population of tags. A plurality of bits of the second bit pattern are received from a first tag during transmission of the substantially constant signal. The transmission of the substantially constant signal to the population of tags is terminated by the reader to stop the first tag from transmitting further bits of the second bit pattern. A substantially constant signal can be repeatedly transmitted to the tags, and terminated, in order to receive additional pluralities of bits from the first tag.

In another aspect of the present invention, frequency hopping techniques and/or spread spectrum techniques can be used by the reader to improve security.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
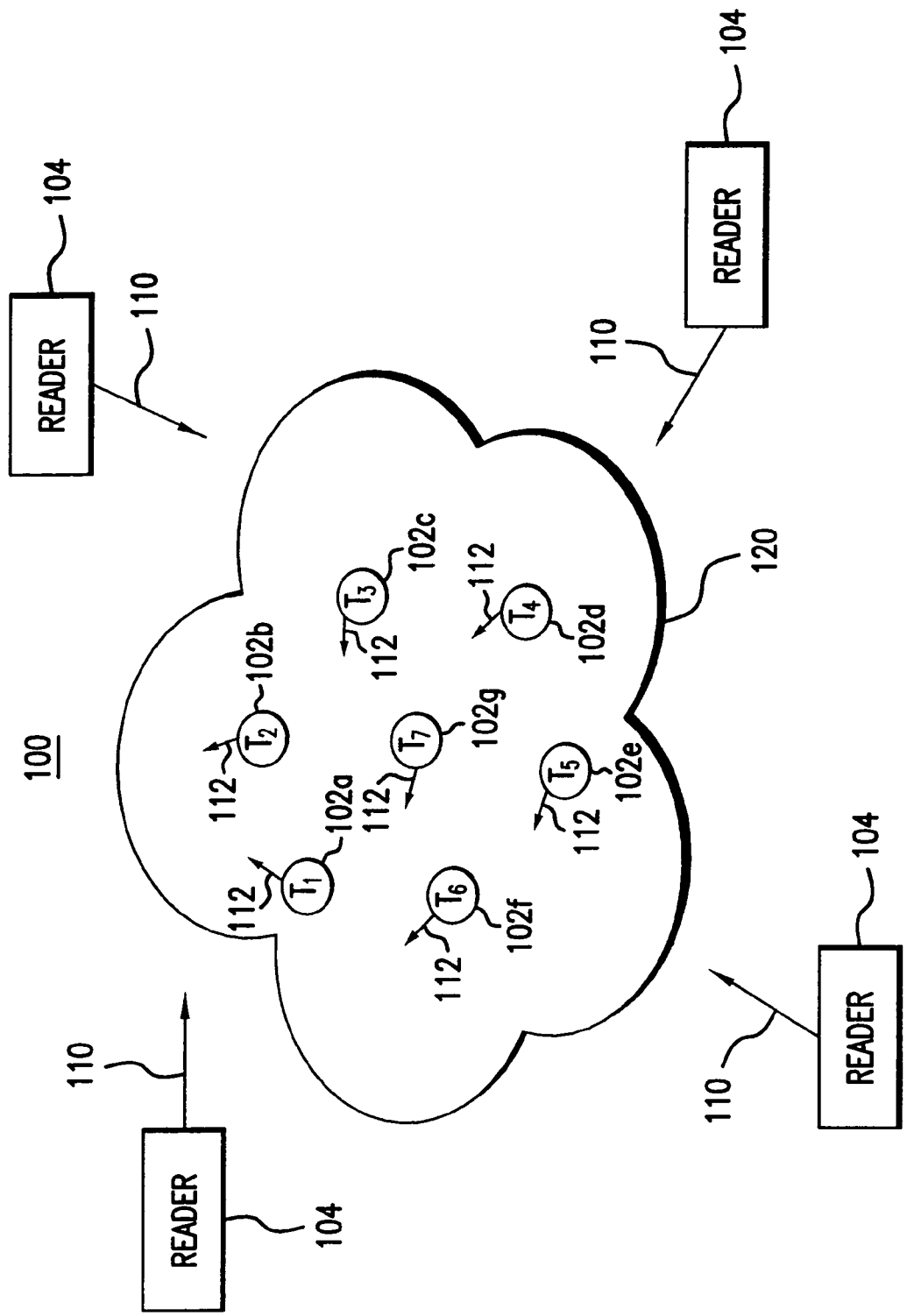
FIG. 1 is a block diagram of an environment where one or more tag readers communicate with one or more tags, according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Tag Interrogation Environment

Before describing the present invention in detail, it may be helpful to describe an example environment in which the invention may be implemented. This example environment is shown for illustrative purposes, and the present invention is not limited to this environment. FIG. 1 illustrates an environment 100 where one or more RFID tag readers 104 communicate with an exemplary population of RFID tags 120, according to the present invention. As shown in FIG. 1, the population of tags 120 includes seven tags 102a-102g. According to embodiments of the present invention, a population of tags 120 may include any number of tags 102. In some embodiments, a very large numbers of tags 102 may be included in a population of tags 120, including hundreds, thousands, or even more.

Figure 2:
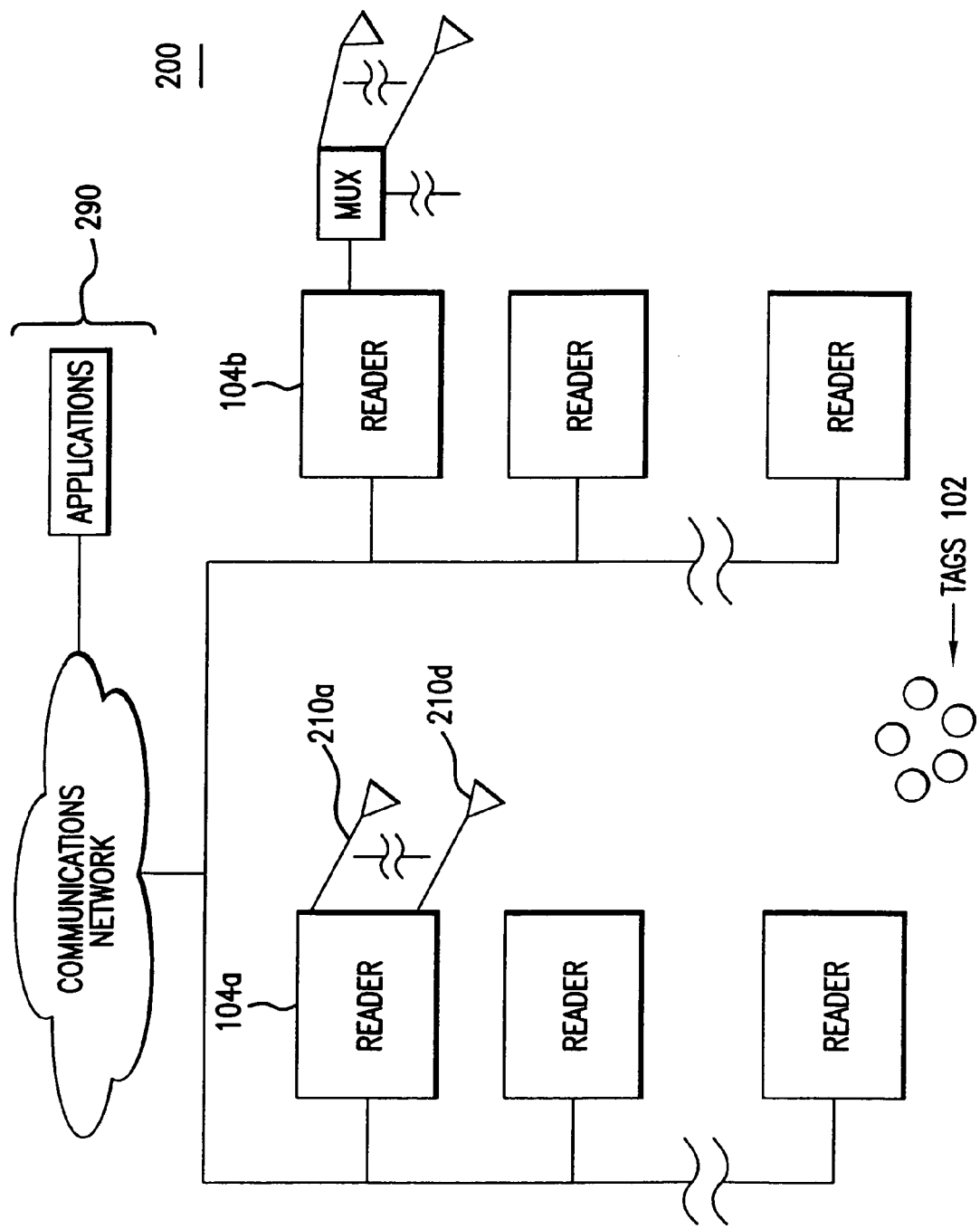
FIG. 2 is a block diagram illustrating an architectural overview of communication between one ore more readers and one or more tags, according to an embodiment of the present invention.

Exemplary environment 100 also includes one or more readers 104. These readers 104 may operate independently or may be coupled together to form a reader network, as shown in FIG. 2. A reader 104 may be requested by an external application to address the population of tags 120. Alternatively, the reader may have internal logic that initiates communication. When the reader is not communicating with the population of tags, the reader 104 typically does not emit RF energy. This allows other readers to act upon the same population of tags, but from a different orientation, so as to achieve as complete of coverage with RF signals into the entire population of tags as possible. In addition, the same reader may act upon the same population of tags using a different frequency to increase tag coverage.

According to the present invention, signals 110 and 112 are exchanged between a reader 104 and the tags 102 according to one or more interrogation protocols. An exemplary interrogation protocol is the binary tree traversal protocol described below. Signals 110 and 112 are wireless signals, such as radio frequency (RF) transmissions. Upon receiving a signal 110, a tag 102 may produce a responding signal 112 by alternatively reflecting and absorbing portions of signal 110 according to a time-based pattern or frequency. This technique for alternatively absorbing and reflecting signal 110 is referred to herein as backscatter modulation. The present invention is also applicable to RFID tags that communicate in other ways.

FIG. 2 is a block diagram of an example RFID system 200 providing communications between one or more readers 104 and tags 102, according to an embodiment of the present invention. RFID system 200 includes a user application domain 290, a network of readers 104a-n, and one or more tags 102. Note that the invention is applicable to a single reader, as well as to a plurality of readers coupled in a network, as shown in FIG. 2. Hence, although "reader" is often referred to herein, it should be understood that the present invention is applicable to any number of readers in any configuration as required by a particular application.

Each reader 104 communicates with a tag 102 via one or more antenna(e) 210. A variety of antenna configurations are available. For example, in an embodiment, reader 104a can be directly connected to up to four antennas (e.g., antennas 210a-210d). In another example embodiment, reader 104b is coupled to and controls a multiplexer. A multiplexer allows for a greater number of antennas to be switched to a single antenna port of the reader. In this way reader 104b may accommodate a greater number of antennae.

User application domain 290 may include one or more user applications. User applications may communicate with one or more readers 104 via a communications network or data link. A reader may receive requests regarding one or more tags 102 from the user application domain 290. For example, an application may request a reader 104 to interrogate a population of tags.

As will be appreciated by persons skilled in the relevant art(s), the present invention can be implemented on a variety of reader platforms and reader network configurations.

Example Tag Embodiments

Structural Overview

Figure 3A:
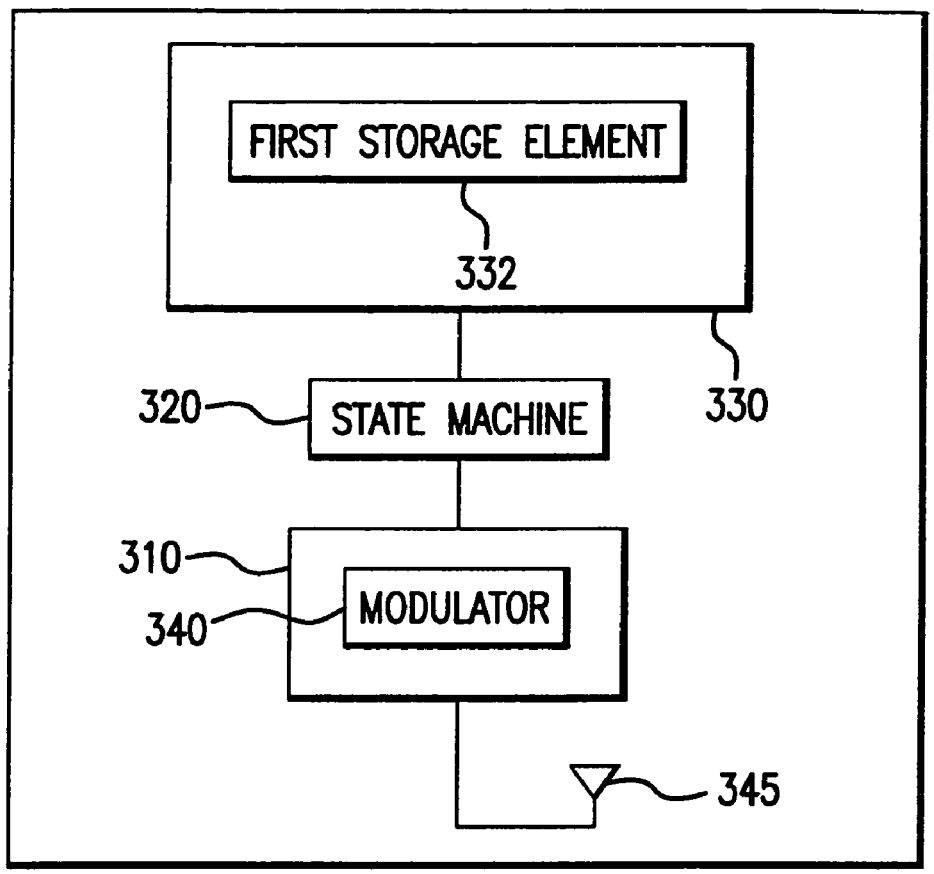
FIG. 3A is a block diagram of an illustrative tag according to an embodiment of the present invention.

FIG. 3A is a block diagram of a tag 102, according to an example embodiment of the present invention. Tag 102 includes a RF interface portion 310, a state machine 320, a data storage section 330, and an antenna 345. Data storage section 330 may include one or more memory elements as required by a particular application. Data storage section 330 stores information used by tag 102 to communicate with reader 104. In an embodiment, information stored in data storage module 330 includes a storage element 332.

Figure 3B:
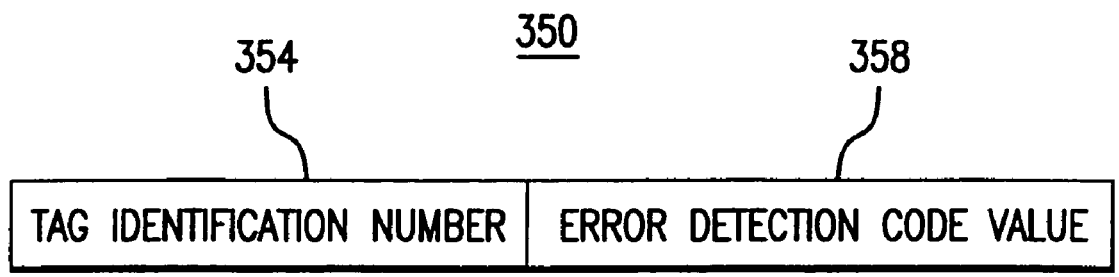
FIG. 3B illustrates an example unique tag identification number.

In accordance with such an embodiment, each tag 102 is identified by a key, which is typically a unique identification number. The bit pattern of the unique tag identification number may be permanently stored or may be temporarily stored in storage element 332 of data storage section 330. FIG. 3B depicts an example of the layout of a unique tag identification number 350. Each unique tag identification number 350 has embedded tag identification bits 354 and error detection code bits 358. For example, each unique tag identification number may have a ninety-six (96) bit identification number and a 16-bit error detection code value. However, the present invention is applicable to other tag identification number lengths and error detection code lengths. Throughout this document, the embedded tag identification number 350 is referred to as the tag identification number.

RF interface portion 310, together with one or more tag antennas 345, provides a bi-directional communications interface with reader 104. RF interface portion 310 receives RF signals from reader 104 through antenna(s) 345 and demodulates the signals into digital information symbols. RF interface portion 310 includes a modulator 340 that modulates digital information symbols into RF signals to be received and interpreted by reader 104. For example, modulator 340 may "backscatter" bits of information onto the RF signal received from reader 104 to respond with information to reader 104.

State machine 320 may include logic, a processor, and/or other components that control the operation of tag 102. State machine 320 receives demodulated information symbols from RF interface portion 310. State machine 320 also accesses information in data storage section 330 as needed. In an embodiment, state machine 320 is implemented with digital circuitry, such as logic gates. Further details regarding state machine 320 are provided below with reference to FIG. 4.

Operational States of a Tag

Tag 102 can exist in various operating states. Each of these operating states describes a mode of operation for tag 102. Upon the occurrence of certain events, tag 102 can transition from one operating state to another. For example, upon occurrence of an event, tag 102 can transition from a present operating state, which is the operating state that tag 102 is operating in when the event occurs, to a new operating state, as dictated by the combination of the present operating state and the event.

Events can be triggered by detection of edges in the transmission from reader 104, by passage of a defined period of time, or by a combination of both edge detection and time passage. Examples of events include master reset event, master dormant event, and a data "NULL."

Figure 4:
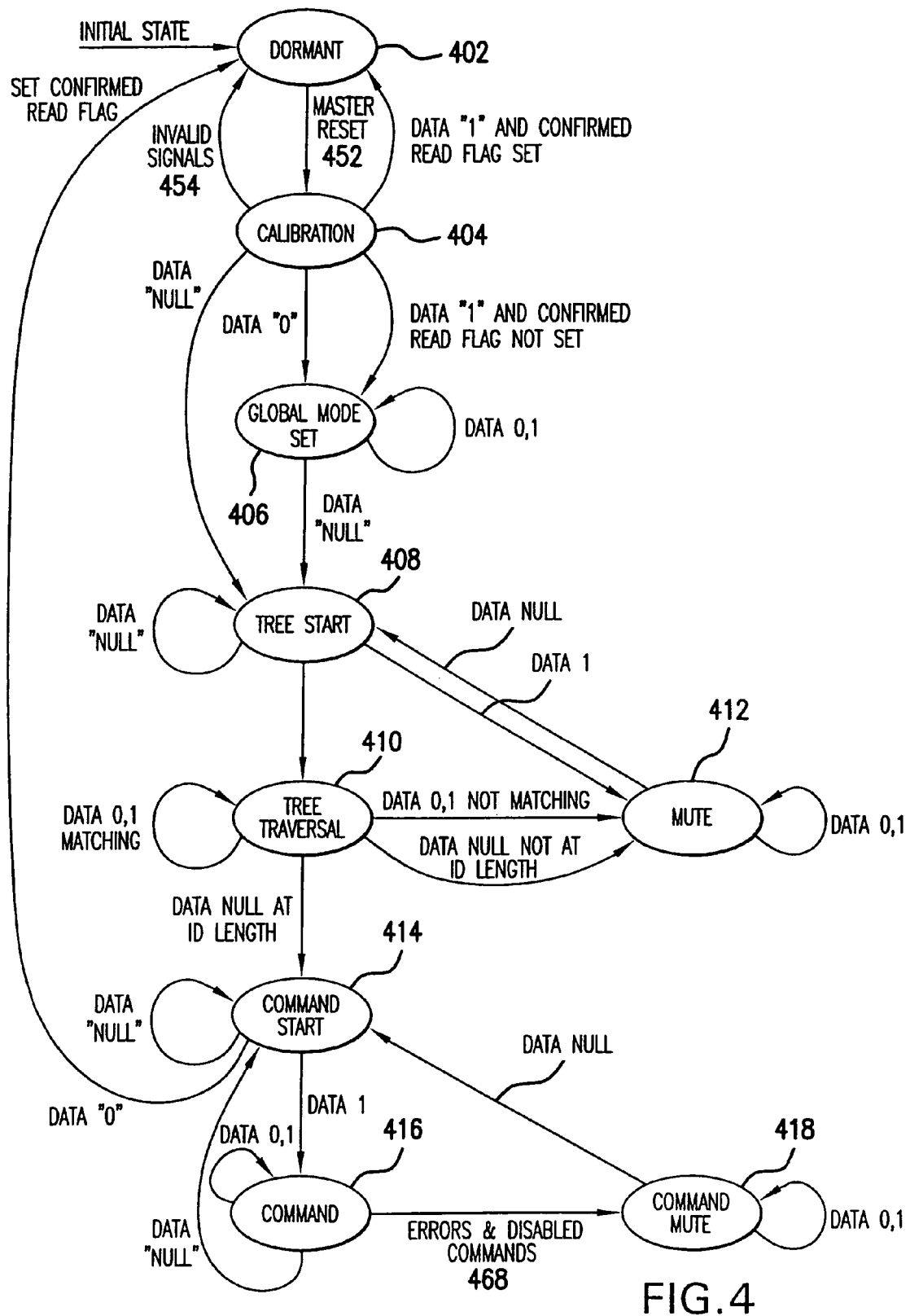
FIG. 4 is a state diagram illustrating various operating states of an RFID tag, according to an embodiment of the present invention.

FIG. 4 illustrates various operating states in a state diagram for tag 102, according to an embodiment of the present invention. In FIG. 4, each operating state is shown as an oval, and transitions between operating states are shown as connections between the ovals. The transitions are annotated with text that describes a corresponding event.

The paragraphs below describe the operating states and the respective transitions shown in FIG. 4. These particular states and transitions are presented by way of example only. Additional and alternative operating states, transitions, and transition causing events can be employed without departing from the spirit and scope of the present invention.

The first state is a dormant state 402. During dormant state 402, tag 102 is largely inactive. Therefore, power is conserved while a tag 102 is in dormant state 402. Tag 102 enters dormant state upon powering up, after receipt of a master dormant event, and at other times described below.

As shown in FIG. 4, tag 102 transitions from dormant state 402 to calibration state 404 upon a master reset event 452. In an embodiment, tag 102 can only transition to calibration state 404 from dormant state 402. In addition, only a master reset event 452 will result in a transition from dormant state 402. In alternate embodiments, other events may cause transitions from dormant state.

In calibration state 404, tag 102 initializes its timing circuitry. In an embodiment, in calibration state 404, tag 102 will not generate logical symbols "0," or "1" as they have not yet been defined. Instead, in calibration 4, tag 102 performs an oscillator calibration procedure and a data calibration procedure. The oscillator calibration procedure involves tag 102 receiving multiple oscillator calibration pulses from reader 104, defined herein as edge transition (data) events. Specific timing is provided between edge transition events. Similarly, the data calibration procedure involves tag 102 receiving multiple data calibration pulses from reader 104. Data calibration results in the definition of data symbols used in communication between the reader and the tag.

As shown in FIG. 4, tag 102 may transition from calibration state 404 to dormant state 402 upon the occurrence of an event 454. In an embodiment, event 454 is defined by the reception of a signal that is not representative of timing signals expected by tag 102. For example, in an embodiment, oscillator calibration signals are defined as 8 pulses of equal length. If the oscillator calibration pulses received by tag 102 are significantly unequal or not within an expected range of lengths, the pulses may be considered invalid, causing occurrence of an event 454. Hence, when tag 102 receives signals that do not cause successful oscillator calibration or data calibration procedures, event 454 occurs.

After successful completion of the oscillator calibration procedure, which results in a tuned oscillator, and the data calibration procedure, which results in defined data symbols, tag 102 expects to receive defined data symbols from the reader 104. The data symbols are defined as data "0," data "1,"

and data "NULL." Master reset and master dormant events may occur at any time, and are immediately processed after occurring.

After successful completion of the calibration procedures, tag 102 receives a data element from the reader. In a preferred embodiment, the data element is a single bit. For example, receipt of a logical "0" data element directs tag 102 to enter global mode set state 406. Receipt of a logical "NULL" directs tag 102 to enter the tree start state 408, skipping global mode state 406. This receipt of a logical "0" or "NULL" causes tag 102 to ignore its read status, as indicated by the confirmed read flag 334. In this way, the reader can address all tags in a population 120, even tags that have previously been read. However, receipt of a logical "1" directs tag 102 to evaluate a confirmed read flag. In such an evaluation, if the confirmed read flag has been set (i.e., indicating that the tag has already been read), tag 102 transitions to dormant state 402. If the confirmed read flag is not set, tag 102 transitions to global mode set state 406. Thus, by sending a logical "1," the reader can read only those tags that have not been read.

In an embodiment, tag 102 receives a sequence of bits from reader 104 when in global mode set state 406. When in global mode set state 406, tag 102 accepts and stores serial binary information into registers in a specific predefined order. Global modes are configured in a binary (on or off) configuration. Each bit, as received dynamically from reader 104, programs a register associated with a mode. The register is associated with a circuit or circuits controlling defined tag functions/modes. In an embodiment of the present invention, defined modes include modulator divisor control, backscatter harmonics limiter control, and backscatter power regulator control.

Modulator divisor control mode controls the frequency in which modulator 340 of the tag will modulate backscatter. In an embodiment of the present invention, this mode is based on an initial frequency of 2.5 MHz for a data "0" and 3.75 MHz for a data "1." Alternatively, other initial frequencies can be used as would be appreciated by persons skilled in the relevant art(s). Backscatter harmonic limiter mode, when implemented, limits the energy of backscatter harmonics. This limitation reduces the effective emissions from the tag on frequencies above the fundamentals. Backscatter power regulator control mode limits the amount of backscatter power in the fundamental frequency of modulation that is reflected by the antenna attached to the tag.

As described above, in an embodiment, a tag 102 receives "modes" from the reader 104 in the form of a series of bits. Each mode corresponds to a bit in the series of bits. Thus, a tag recognizes each mode by the location of the corresponding bit in the series of bits. The order of modes in the series of bits can be predefined in the tags during manufacturing of the tags, or can be otherwise defined. Future modes may be defined and assigned to open bits in the sequence, although these can alternatively be defined "on the fly." In an embodiment, the tag will default (power on reset) to the bit value "0" for all modes prior to accepting the first bit in the sequence. In this way, global mode settings are a variable amount of bits. Global modes may be completely omitted in operation if all default values are acceptable for operation.

Note that in an alternative embodiment, a tag receives a global command from a reader, instead of global mode information. For example, when in a particular state, tag 102 can receive a global command from reader 104. Instead of a bit for each mode (as for global modes), reader 104 transmits an N-bit length global command to tag 102. For example, the global command can be 8 bits in length, which would provide for 256 possible commands. The commands can be configured to cause tag 102 to perform any operation described elsewhere herein, or otherwise known.

Tag 102 transitions to tree start state 408 upon receipt of a logical "NULL" data element. During tree start state 408, tag 102 expects a command from reader 104 in the form of a data symbol. In an embodiment, the command is a single bit. For example, receipt of a logical "0" symbol directs tag 102 to enter tree traversal state 410. However, receipt of a logical "1" symbol directs tag 102 to enter mute state 412. In an embodiment, receipt of a logical "NULL" symbol does not effect the state of tag 102 in tree start state.

When operating in tree traversal state 410, tag 102 transmits its identification number to reader 104 according to a binary traversal protocol that enables reader 104 to quickly interrogate a population of tags 120. An example of a binary traversal protocol is described below.

Tag 102 may enter mute state 412 from tree traversal state 410 or tree start state 408. For example, tag 102 may enter mute state 412 from tree traversal state after an unsuccessful negotiation of its tag identification number. In mute state 412, tag 102 receives data from reader 104. However, when in mute state 412, tag 102 provides no responses to reader 104. Thus, mute state 412 disables tag 102 from responding to a particular request for an identification number.

After a successful negotiation of its tag identification number, tag 102 transitions from tree traversal state 410 to command start state 414 upon receipt of a "NULL" symbol from reader 104. A successful negotiation is indicated when tag 102 receives a "NULL" symbol at the tag identification length. During command start mode 414, if a data "0" is received from reader 104, tag 102 enters dormant mode 402. This transition represents a confirmed read of tag 102. Prior to entering dormant state, tag 102 sets the confirmed read flag. This flag then indicates that the tag has been confirmed read by the reader.

When in command start state 414, if a data "1" is received from reader 104, tag 102 enters command state 416. In an embodiment, receipt of a logical "NULL" symbol does not effect the state of tag 102 in command start state 414.

Note that during tree traversal operations, one or more tags 102 may be active and in tree traversal state 410, or temporarily inactive and in mute state 412. Any other tags that have been processed (i.e., confirmed read) will be in dormant state 402. Reader 104 may collectively address the full population of tags 120 through implicit instructions. This means that upon receipt of a certain symbol, a tag will determine the instruction based upon its current state. Thus, a tag does not have to receive a complete "explicit" instruction to perform functions, causing less data (e.g., long bit length explicit instructions) to need to be transferred and saving transfer time. For example, reader 104 may send a logical "NULL" symbol to the population of tags. Those tags that are in mute state 412 will transition to tree start state 408. If the "NULL" is received at the bit in the traversal corresponding to the identification number length, then any tag in tree traversal state will transition to command start state 414. If the "NULL" is not received at the bit of the traversal corresponding to the identification number length, then any tag in tree traversal state will transition to mute state 412. Implicit instructions are also used when a fully negotiated tag is in command start state 414 or command state 416 and one or more tags are inactive and in mute state 412.

When operating in command state 416, tag 102 receives a command from reader 104. The command consists of multiple bits. In an embodiment of the present invention, the command is 8 bits in length, although in other embodiments, the command can have other lengths. Command state 416 allows reader 104 to initiate features and functions on a tag, after the tag has been identified via a successful binary tree traversal. Tag 102 may transition from command state 416 to command mute state 418 upon occurrence of an event 468. In an embodiment, event 468 is defined as the detection of communications errors within a command or a request for an unknown or disabled function. Tag 102 returns to command start state 414 upon receipt of a logical "NULL" symbol from the reader.

Command mute state 418 is similar in function to mute state 412. When operating in command mute state 418, tag 102 receives data but does not respond. Tag 102 may return to command start state 414 from command mute state 418 upon receipt of a data "NULL."

Binary Tree Traversal Protocol

In accordance with an embodiment of the present invention, a binary tree traversal methodology is used in order to establish communication between a reader 104 and one of a population of tags 120 that are within the communication range of the reader. In an embodiment, contention between the tags 102 is avoided by requiring transmissions from each tag 102 to the reader 104 to be unique in a separation of frequency. In alternative embodiments, contentions can be avoided in other ways of communicating. Contention may be defined as communications by multiple transmissions in the same frequency, time, and/or phase that thereby destructively interfere with each other's attempted transmission. Thus, in an example binary traversal algorithm, one bit of information is negotiated at a time between the reader 104 and the current population of tags 102 that the reader is addressing.

Each tag response is defined by two frequencies, one frequency for a data "0", and the other frequency for a data "1". In such a manner, many tags can simultaneously and non-destructively communicate a data 0. For example, it is not important that the reader cannot differentiate a single data 0 from multiple data O's, just that there exists a data 0. Alternatively, for example, a tag response may be defined by two time periods, one time period for "0", and the other for "1."

In an embodiment, the binary tree traversal process eliminates tags from communication until only one tag with a unique number is isolated and verified. As described above, each level in the binary tree represents a bit position in the tag identification number. As the reader proceeds through nodes (and levels) in the binary tree, it directs a subset of the population of tags to remain active and a subset of the population of tags to go inactive. The reader may send out a bit or combination of bits in a signal to cause the tags to begin a binary traversal, as described above. The tags then respond with the first bit of their identification number. The reader then determines which branch of the binary tree to follow. For example, the reader may select a "0" bit as the first bit of interest. The reader transmits the "0" bit. Tags that last sent a "0" bit remain active; those that did not will go inactive. This process continues, where the reader selects one of the "0" and "1" branches of the binary tree. Statistically, on each bit exchange, one half of the tag population will go inactive. This process continues until the reader reaches a node in the last level of the binary tree and results in a unique tag isolation and elimination. This process can be repeated until each tag in the population of tags is isolated.

For more information concerning binary tree traversal methodology, and, more generally, communication between an RFID reader and a population of RFID tags in accordance with an embodiment of the present invention, see U.S. Pat. No. 6,002,544, entitled "System and Method for Electronic Inventory" which is incorporated herein by reference in its entirety, and the following co-pending U.S. Patent Applications, each of which is incorporated by reference herein in its entirety: application Ser. No. 09/323,206, filed Jun. 1, 1999, entitled "System and Method for Electronic Inventory,"; application Ser. No. 10/072,885, filed Feb. 12, 2002, entitled "Method, System and Apparatus for Binary Traversal of a Tag Population,"; and application Ser. No. 10/073,000, filed Feb. 12, 2002, entitled "Method, System and Apparatus for Communicating with a RFID Tag Population,".

Example Embodiments of the Present Invention

The present invention provides for secure communications (i.e., negotiations) between readers and tags. According to the present invention, a reader can communicate with tags on an open-air communication channel, while keeping tag data, such as tag identification numbers, secure.

According to embodiments of the present invention, binary traversal algorithms, such as described above, can be modified to provide for secure communications between readers and tags. For example, a conventional binary tree traversal algorithm can be modified to provide for the secure negotiations.

Embodiments of the present invention for communications between readers and tags with improved security are described in detail in the subsections below.

Implied Scroll Embodiments

According to an embodiment of the present invention, an "implied scroll" is used to provide for improved security during communications between readers and tags. According to this embodiment, a tag "scrolls" by transmitting multiple response bits during a single response interval provided by the reader, instead of the normal single bit response. The reader transmits a substantially constant output signal during which each participating tag scrolls multiple response bits in series to the reader. The reader monitors the scrolling series of response bits from the tag(s), and determines when to terminate the response of the tag(s). The reader can terminate the response of the tag(s) by ending the substantially constant output signal. After ending the response of the tag(s), the reader can transmit one or more subsequent substantially constant output signals to cause further bit scrolling, and/or can commence the interchange of single bits with the tag(s) through a binary traversal operation.

In an embodiment, tags can "scroll" or transmit serial streams of bits to the reader in response to an explicit command received from the reader, such as a command bit string. In an alternative embodiment, tags can be caused to scroll bits to the reader by an implied command of the reader. For example, in an embodiment, after the tag transmits a first response bit, the tag waits for a next bit (i.e., a forward link symbol) from the reader. If the tag continues to receive substantially constant/continuous power from the reader for longer than a specific interval, the tag can recognize this as an implicit command to modulate its next response bit back to the reader. The tag can continue to modulate further response bits back to the reader as long as the tag keeps receiving the continuous power signal from the reader. In this manner, a tag can scroll multiple bits to a reader without further intervention from the reader.

Scrolling can be used to enhance security in various ways. For example, scrolling allows for multiple bits to be transmitted from a tag to the reader for every reader transmitted bit. Because tag bits are transmitted at a lower power, these bits are harder for unwanted third parties to detect. Because fewer reader bits are transmitted during scrolls, there are fewer higher powered bits transmitted that are easier to detect.

Figure 5:
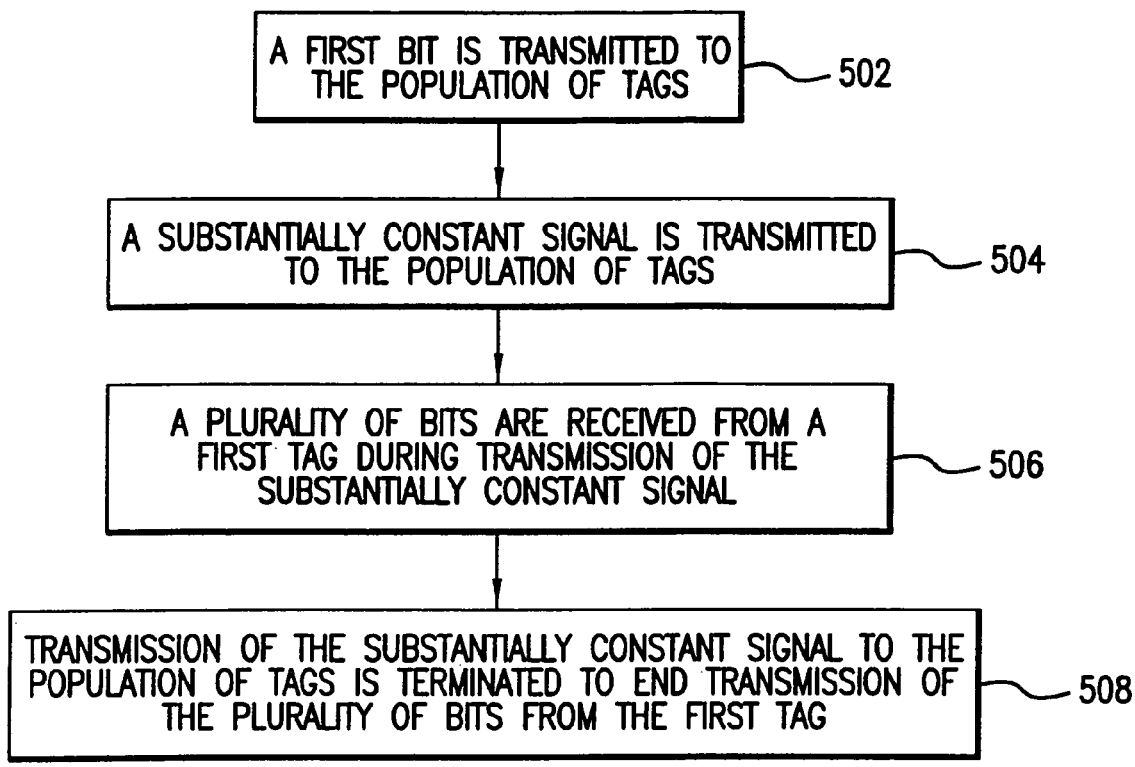
FIG. 5 shows a flowchart providing example steps for a reader to communicate with a population of RFID tags with improved security using bit scrolling, according to an example embodiment of the present invention.
Figure 6:
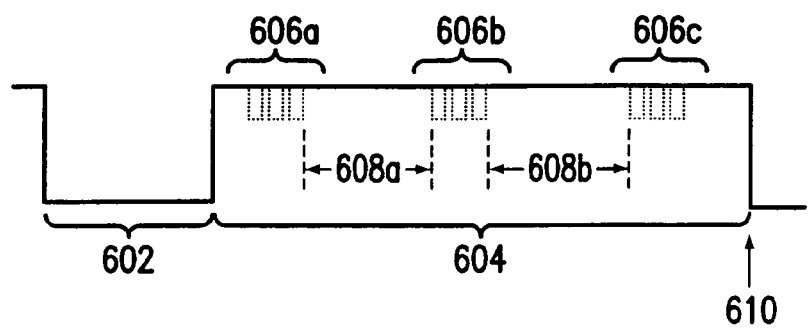
FIG. 6 shows a signal diagram representing an example communication between a reader and tag, according to an example embodiment of the present invention.

FIG. 5 shows a flowchart 500 providing example steps for a reader to communicate with a population of RFID tags with improved security, using bit scrolling, according to an example embodiment of the present invention. Other structural and operational embodiments will be apparent to persons skilled in the relevant art(s) based on the following discussion. The steps of FIG. 5 are described in detail below, with reference to FIG. 6. FIG. 6 shows a signal diagram 600 representing an example communication between a reader and tag, according to an example embodiment of the present invention.

Flowchart 500 begins with step 502. In step 502, a first bit is transmitted to the population of tags. For example, the first bit can be transmitted by the reader to begin a binary traversal, or can be any bit within a binary traversal tree. For example, FIG. 6 shows an example first reader bit 602 transmitted by a reader. In the example of FIG. 6, first reader bit 602 is represented by a low signal transmitted by the reader for specific period of time. For illustrative purposes, the signal shown transmitted by the reader in FIG. 6 is shown in logical form, without a carrier frequency, etc.

In step 504, a substantially constant signal is transmitted to the population of tags. For example, as shown in FIG. 6, a substantially constant RF output is provided by the reader, shown as substantially constant signal portion 604.

In step 506, a plurality of bits are received from a first tag during transmission of the substantially constant signal. For example, as shown in FIG. 6, a first tag response is shown as first tag response 606*a* (shown in FIG. 6 as modulating substantially constant signal portion 604 with three cycles of a response backscatter frequency). For instance, first tag response 606*a* is a normal response of a tag during a binary traversal after receiving a reader bit, first reader bit 602. As shown in FIG. 6, the tag waits a specific time interval 608*a* from responding with first tag response 606*a* (or from any other reference point). After specific time interval 608*a* expires, the tag responds (i.e., scrolls) with a next bit, second tag response 606*b*. The tag makes this response due to the implied command from the reader, which merely maintains substantially constant signal portion 604. In a likewise manner, after expiration of a second specific time interval 608*b*, the tag responds (i.e., scrolls) with still another bit, third tag response 606*c*. Once again, the tag makes this response due to the implied command from the reader, which merely maintains substantially constant signal portion 604.

In step 508, transmission of the substantially constant signal to the population of tags is terminated to end transmission of the plurality of bits from the first tag. For example, as shown in FIG. 6, substantially constant signal portion 604 is terminated at point 610. Thus, since another specific time interval 608 did not expire between third tag response 606 and point 610, the tag understands this as the implied command to stop scrolling out response bits. After point 610, the reader can transmit a next reader bit 602 to direct the population of tags down another branch of the binary tree, issue a command, or do any other reader function.

In an embodiment, the length of an interval 608 that a tag waits before modulating a next response bit back to the reader can be set in various ways. For example, the length of the interval 608 can be preprogrammed into the tag. Alternatively, an interval 608 can be defined in a training/synchronization sequence transmitted from the reader to the tag during operation.

Such an implied scroll procedure can be useful to enhance binary traversals of tag populations. For example, a length of time required to perform a binary traversal can be reduced. For instance, in an embodiment, during a binary traversal, a reader can transmit bits at nodes in a binary tree where the reader knows that both the "0" and "1" branches of the tree from the node are populated with tags. At other nodes, the reader can allow the tag(s) to scroll bits. If the reader receives both "0" and "1" responses simultaneously from tags, then the reader can terminate the scroll by transmitting a bit that directs which branch the binary traversal at this binary tree "fork" will take. Because binary trees are frequently sparsely populated, an ID number having a large number of bits (e.g., such as 80 bits) can be isolated by the reader only having to transmit much fewer bits (e.g., 3 or 4 bits) to resolve bit collisions/forks in the binary tree, and scrolling through the remaining nodes of the binary tree.

Note that in an embodiment, a reader may have a limit on how many bits it will allow to scroll continuously before terminating the current bit scroll. For example, the number of scroll bits may be limited in order to keep the reader and tags synchronized. In another example, the number of scroll bits may be limited so tags do not confuse the continuous signal from the reader with other signals that can be sent by a reader, such as a master reset signal, etc. Thus, for example, scrolls may not be allowed to proceed through more than 10 or 12 bits at a time. For an example 80 bit ID number, scrolling 10 bits at a time will still only require that around 12 percent of the ID number be broadcast from the reader, thus speeding up a binary traversal operation (where all 80 bits are broadcast). Furthermore, in this manner, the tag ID numbers are kept more secret from an undesired third party.

Frequency Hopping and Spread Spectrum Embodiments

As described above, it is possible for an unwanted third party to fool or "spoof" a reader into revealing complete tag ID numbers. The unwanted third party can transmit a false tag response to cause bit collisions and thus force the reader to transmit bits to resolve the collision. The unwanted third party receives the bits from the reader, and sends out false response signals multiple times to piece together one or more ID numbers of the tag population. Given enough time, the unwanted third party could potentially "spoof out" the entire tag population binary tree.

Readers that transmit at ultra high frequencies (UHF) can use a frequency hopping spread spectrum approach to mitigate multi path nulls and interference from other readers. Thus, an unwanted third party attempting to spoof a RFID system will have to follow along with the reader frequency hops. If the reader uses a pseudo-random hop sequence, it may be relatively easy for the unwanted third party to follow the reader frequency hops. If the reader uses a true random frequency hop sequence, it is difficult, if not impossible for the unwanted third party to follow the frequency hops. If there are many readers operating simultaneously to negotiate populations of tags, then any one channel, or any sequence of channels that the unwanted third party may select, will contain a random interleaving of incomplete tree data. Thus, the unwanted third party will be unable to extract meaningful information in a reasonable amount of time.

For RFID systems that desire improved security but use only one or a few readers, the random frequency hop technique will not be as robust. In an embodiment, to provide an improved system, a reader can transmit a direct sequence spread spectrum signal. In a preferred embodiment, the direct spreading sequence is random. Similarly to the tags, an unwanted third party could listen in on the reader transmission (i.e., the forward link) with a wide band receiver. To spoof a tag, the exact spreading sequence must be known by the unwanted third party before the transmission of the reader is received. The unwanted third party will most likely be receiving and transmitting at a relatively great distance. Thus, even if the unwanted third party can receive the reader transmissions and quickly transmit a modulated replica, the phase shift caused by the propagation delay will likely prevent the reader from despreading the unwanted third party's spoofing signal properly. As a result, the spoofing signal will be spread over a wider band than a true tag response, and will be ignored.

In embodiments, depending on the particular situation, random frequency hopping, random direct sequence spread spectrum, or a hybrid approach can be used to provide robust data protection.

Binary Traversal Embodiments without Application Data

In another embodiment of the present invention, a binary tree traversal provides for improved security. According to the present embodiment, a binary number of a tag, other than the tag identification number, is used for negotiating a binary traversal. Furthermore, this binary number, or "second key," contains no application data. In other words, the binary number returned to the reader by the tag does not contain information that can be correlated with, or can be used to identify the object to which the tag is associated. By not transmitting application data to the reader, a tag singulation (i.e., isolation of a single tag) by the reader can occur with security maintained over any information about the item to which the tag is attached. In embodiments, several types of binary numbers can be used in tags to provide varying degrees of security, with different performance tradeoffs.

Typically, tag ID numbers (i.e., the first key) that are to be negotiated in a binary traversal are required to be unique for all possible tagged items over a period of time. This can entail a lengthy bit sequence to cover uniqueness for large numbers of items, including even trillions of items worldwide. Negotiating such a large number of bits required for tag uniqueness can take a relatively long period of time.

Typically, however, a particular reader is not capable of powering and/or reading more than a particular number of passive tags. The number of tags that can be powered by a particular reader depends on a tag broadcast power, a distance from the reader to the tags, and other factors. In an example situation, a reader can power about 2000 passive tags, which can be covered by an 11 bit binary string (i.e., 2048 unique values). Hence, in such a situation, it would not be efficient to attempt to always read a complete ID number, such as a 112 bit identification number, for example (e.g., 96 bits ePC plus 16 bits CRC) every time. Statistically, in the present example, there is only a need for 11 bits to accommodate tag uniqueness within the reader field. In embodiments, however, further bits than the minimum may be used for various reasons, such as for error correction, etc.

Figure 7:
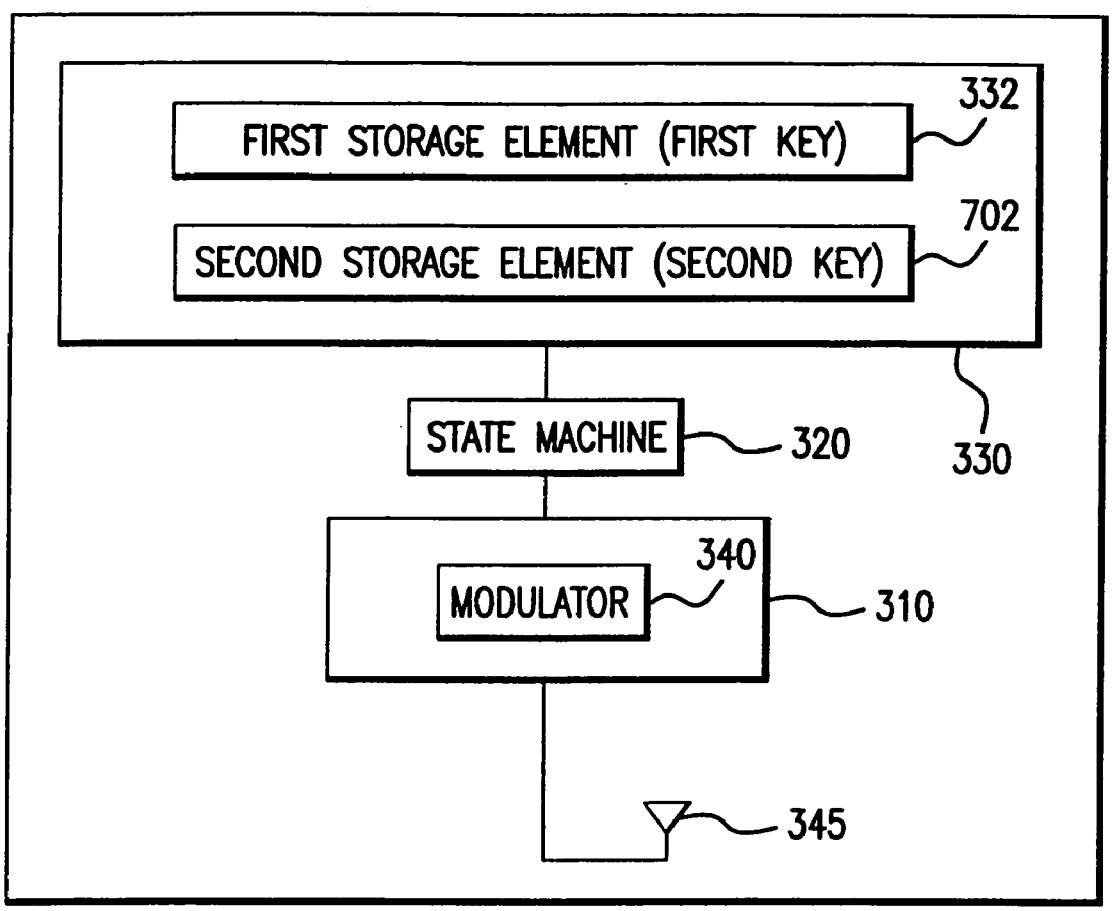
FIG. 7 shows an example tag that includes a second storage element for storing the bit pattern of a second key, according to an embodiment of the present invention.

According to the present invention, a reader singulates a tag using the bit pattern of a second key. Subsequently, the tag can transmit to the reader its relatively lengthy identification number or item key (e.g., ePC or similar) (i.e., first key), which often contains information about the item the tag is attached to. However, this transmission only has to be done once, as the two keys can be associated in the reader or the host system for future identification. Thus, in such an embodiment, the second key is shorter than the first key. Note, however, in alternative embodiments, as described below, the second key can be the same length as or longer than the first key. FIG. 7 shows an example tag 700 that includes a second storage element 702 for storing the bit pattern of the second key, according to an embodiment of the present invention.

The second key can include a single bit pattern, or plurality of combined bit patterns. According to an example embodiment of the present invention, encoding of the second key is broken up into several portions or sections. Each section provides additional uniqueness. For example, a first portion is used as a minimum level of statistical uniqueness in the expected population of tags. For instance, in an expected population of 1024 tags, 10 bits for a first portion is an absolute minimum. Furthermore, additional bits can be added for probability and error detection schemes. Hence, for an example population of 1024 tags, 16-24 bits may be used in the first portion. In many cases, a broadcast of this many bits in such a tag population would result in isolation of a single tag. If it is determined that transmission of this many bits does not isolate a tag, then a second portion of the second key can be negotiated, and so on until isolation of a tag is obtained.

In further example embodiments, the second key can be implemented as follows:

(A) A simple sequence number: A first tag is assigned a binary number 1 as the second key, a second tag is assigned a binary number 2 as the second key, and so on. These numbers could be assigned when the tags are manufactured, or at any time later. Such a number could be stored in storage 702, such as shown in FIG. 7, for example. However, second keys assigned in the manner may yield information about the tags if detected by an unwanted third party. This is because a range of numbers assigned to a particular population of tags may be known (e.g., by the unwanted third party) to have been produced in a certain date range, or sold for a specific purpose. Thus, knowing such information about the tags, and having determined the numbers assigned to the tags by eavesdropping, an unwanted third party may be able to deduce information about the objects to which the tags are associated. Thus, although this is a relatively simple solution, some information about the items to which the tags are attached may be undesirably gained through eavesdropping measures.

(B) Randomly generated static numbers: A random, fixed number may be stored in a tag as the second key. Such a number could be stored in storage 702, such as shown in FIG. 7, for example. The use of such a randomly generated static number avoids the type of eavesdropping described in (A) above. However, an overall number of tagged items in the locality may be obtained by an eavesdropping third party. For example, the unwanted third party could eavesdrop, and record all of the random, fixed numbers assigned to the tags in the local population that are broadcast. The unwanted third party could then compare the recorded values with previous entries obtained by the eavesdropper to determine an estimate, or exact count, of the number of tagged objects present. Thus, this solution is better at keeping the identity of items secure, while possibly allowing an unwanted third party to determine the number of items present.

Note that the second key can be assigned to be a fixed pseudo-random number. Preferably, the second key is assigned a bit pattern that is non-correlated with the bit pattern of the first key. For example, the second key can be assigned a bit pattern that includes bits corresponding to a location on the wafer in which the integrated circuit chip of the RFID tag was formed. For example, the bit pattern could include bits indicating an X-Y location of the chip on the wafer, or a number of the chip in the wafer. The bit pattern could further include a unique number corresponding to the particular wafer from the chip was removed, to further correlate the second key with the wafer. In another example, the bit pattern of the second key can include bits corresponding to a time stamp, such as a time that the tag was manufactured, a time that the chip was produced, or other relevant time stamp. In another example, the bit pattern of the second key could include a portion of the bit pattern of the first key. For example, the second key could include bits of the identification number of the tag. In another example, the bit pattern of the second key could include cyclic redundancy check (CRC) processed bits related to the tag, and/or bits processed according to any other error checking algorithm. In another example, bits of the second key could be hashed according to a hashing code. In further embodiments, any combination of these bit patterns can be used in the second key, along with any other bit pattern(s), as desired.

(C) Dynamically generated numbers: The use of dynamically generated numbers for each tag is relatively even more secure against eavesdropping and spoofing. In this embodiment, the second key can be changed each time the population of tags is negotiated or addressed in a binary traversal operation. Because of this, an outside eavesdropping system could not tell whether a new second key transmitted by a tag applies to a new item, or to an existing item that is being read again with a new second key. Thus, in this embodiment, the number of items present cannot be readily determined, as in the embodiment of (B) described above.

Figure 8:
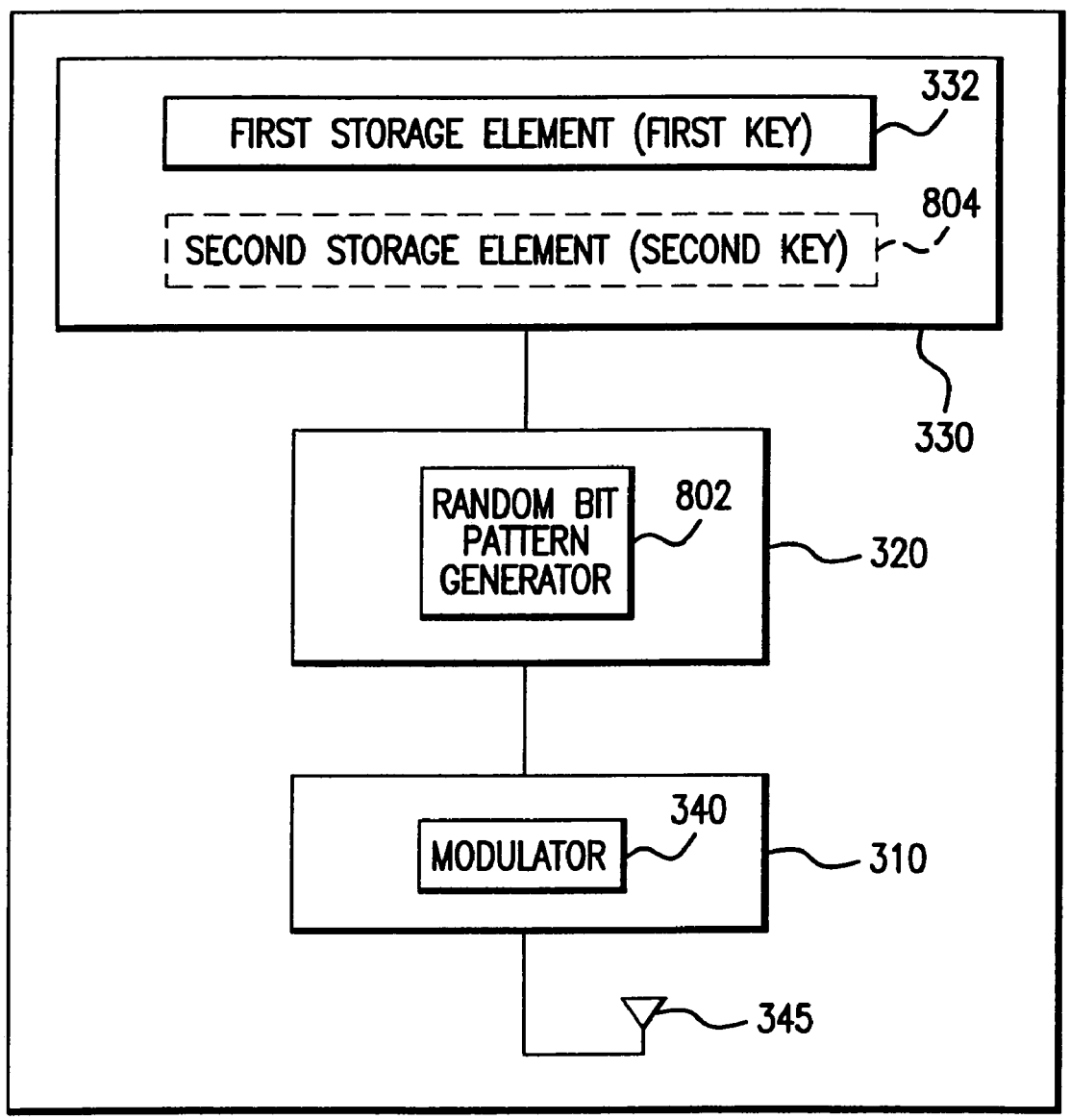
FIG. 8 shows an example tag that includes a random bit pattern generator, according to an example embodiment of the present invention.

FIG. 8 shows an example tag 800 that includes a random number generator or random bit pattern generator 802, according to an example embodiment of the present invention. In an embodiment, random bit pattern generator 802 can generate a random number or bit pattern for the second key having a known fixed length, or alternatively, can generate a random number of any length, as dictated by the reader. Thus, in some embodiments, tags can have a flexible bit length second key, as determined by the reader. In this manner, the reader can cause the tag to respond with any numbers of bits, including bits the 1s, 10s, 100s, 1000s, and any other length ranges, until the reader decides to request no further bits.

Furthermore, in an embodiment, the second key generated by random bit pattern generator 802 can be stored in a second storage element 804, when present. Alternatively, in an embodiment, the second key is not stored, and is transmitted by the tag bit-by-bit as it is generated by random bit pattern generator 802. Thus, in such an embodiment, second storage element 804 is not present. Such an embodiment is useful when a tag transmits a different second key each time it is negotiated, and/or transmits a second key with variable length. Any type of random bit pattern generator can be used for random bit pattern generator 802, including an oscillator, a combination of logic gates, or other type of random bit pattern generator known to persons skilled in the relevant art(s).

A tradeoff with using a dynamically generated number is that in order for the reader to know what item a tag is attached to, after reading the second key, the first key of the tag must be read. However, because the tag was already isolated using the secure second key, the reader can transmit a command to the tag to transmit the first key (e.g., identification number) to the reader, rather than the reader transmitting the first key to the tag, as during a normal binary traversal. Thus, only the response of the tag, such as a backscatter type response, will contain the first key.

The approach of (C) above solves several problems. For example, when negotiating using a bit to bit approach, such as in a binary tree traversal, information in the first key is essentially broadcast on the reader transmit channel (i.e., forward link), which is a relatively high powered channel (i.e., high power is required to activate the passive tag). Such a signal may be easily eavesdropped upon from a fairly long distance (hundreds of feet). After repeated scans of a tag population by readers, random noise, or inserted noise (spoofing), can eventually cause all or a significant portion of the first keys of the tags to be transmitted on the forward link. However, in an embodiment, the present invention provides that the first key is not transmitted by the reader in the forward link. Instead, the second key, which can be much shorter than the first key, and can be devoid of item related information (i.e., is non-correlated to the attached object), is transmitted by the reader in the forward link. If desired, the reader can then have the singulated tag transmit its first key in the "backward" link (i.e., tag to reader). Because the responses of a tag are much lower power than transmissions of a reader, the responses are much more difficult for an unwanted third party to eavesdrop in on. Thus, even though the tag transmits the first key to the reader, this backward link transmission is much more difficult to detect, allowing for improved security over having the reader transmit the first key in the forward link.

Another problem solved by the present invention is related to the number of bits required to be communicated between readers and tags. According to the present invention, the number of bits negotiated between tag and reader (i.e., the second key) can be substantially less than the item identification number (i.e., first key). Once the reader has obtained the first key from the tag, the reader can address the tag using the second, shorter, key, until a new second key is generated by the tag. In embodiments, the reader can send a command to the tag to respond with a new second key. Alternatively, the tag can always respond with a newly generated second key, or can respond with a newly generated second key after every N interrogations, where N is greater than or equal to 1.

By addressing a tag with a second key that is shorter than the first key, communications can occur much faster. As described above, typically a tag only needs to be unique within the field of a reader, so really only needs a key much shorter than the first key. The first key can provide uniqueness worldwide and can be over 100 bits. Uniqueness in the field of the reader likely requires fewer bits. By resolving tag reads based on minimal number of bits according to the present invention, the speed of performance is increased on tags that need continued monitoring, such as in an automated inventory system. Higher system performance can result in faster overall inventory scans, which can detect inventory changes faster.

Item level information that is of security concern (i.e., first key information) is not transmitted as part of the tag negotiation process of the present invention because a non-correlated second key is instead used.

Thus, advantages of the present invention include providing the capability to read item identification numbers securely, from a reader transmit/broadcast perspective. Additionally, in static applications (such as inventory), much better efficiency can be obtained using the shorter second key, while keeping item identification numbers (i.e., first keys) private from competitors or other unwanted third parties.

Figure 9A:
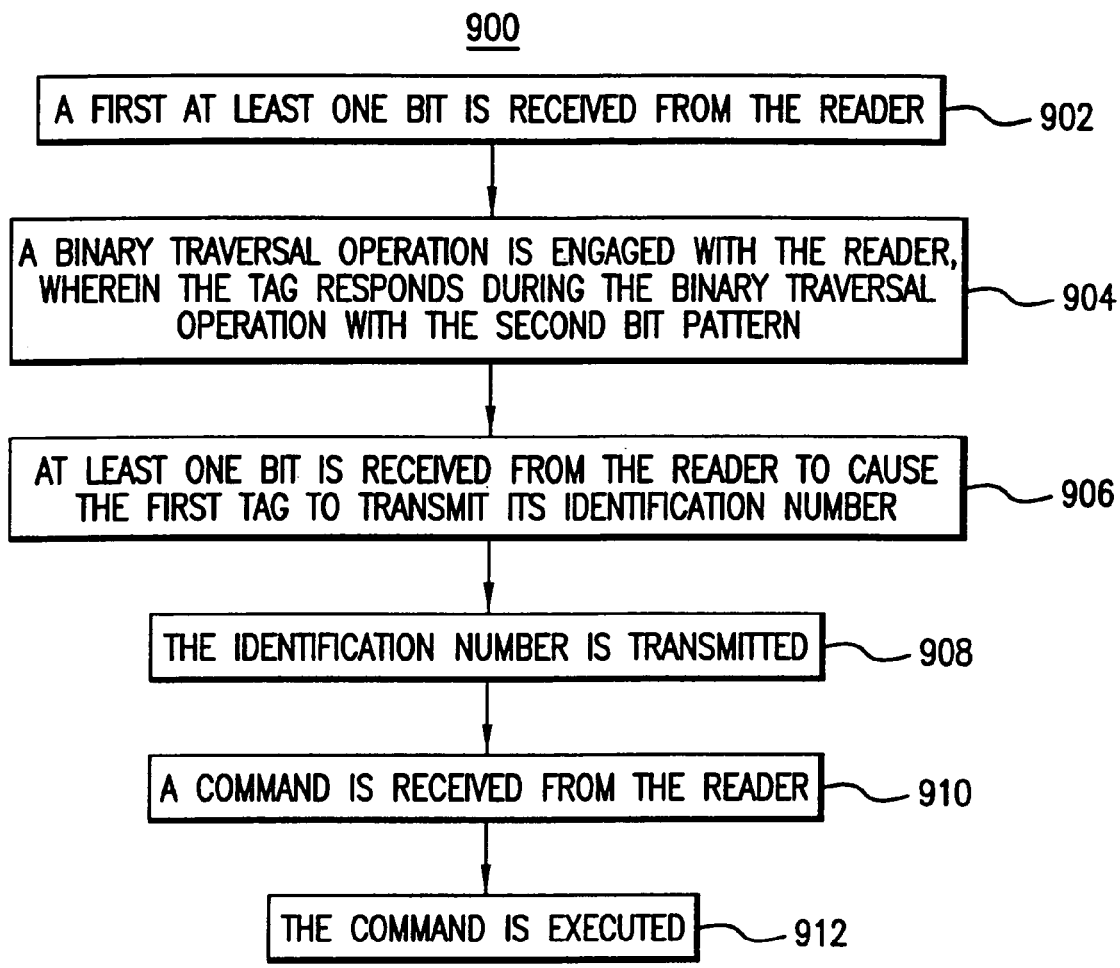
FIGS. 9A and 9B show flowcharts providing example steps for a tag to communicate with a RFID reader with improved security, using a second key, according to example embodiments of the present invention.

FIG. 9A shows a flowchart 900 providing example steps for a tag to communicate with a RFID reader with improved security, according to an example embodiment of the present invention. In the example of flowchart 900, the example tag stores an identification number (i.e., a first key) which is defined by a first bit pattern. Other structural and operational embodiments will be apparent to persons skilled in the relevant art(s) based on the following discussion. The steps of FIG. 9A are described in detail below.

Flowchart 900 begins with step 902. In step 902, a first at least one bit is received from the reader. The first at least one bit causes the tag to respond to a binary traversal operation with a second bit pattern. The first at least one bit can be any bit or combination of bits to cause tags to respond with the second key. This can amount to a state transition by the tag, or other tag algorithm change.

In step 904, a binary traversal operation is engaged with the reader, wherein the tag responds during the binary traversal operation with the second bit pattern. Thus, as described above, the tag communicates with the reader, responding to the reader with bits of the second key. The tag can be singulated in this manner.

Steps 906, 908, 910, and 912 are optional, according to further example embodiments of the present invention.

In step 906, at least one bit is received from the reader to cause the first tag to transmit its identification number. For example, as described above, once the tag is singulated, the reader may desire to read the identification number, first key, of the tag, in order to identify the object to which the tag is attached. Thus, the reader can use any mechanism to cause the tag to respond with bits of the first key.

In step 908, the identification number is transmitted.

In step 910, a command is received from the reader. For example, as described above, once the tag is singulated, the reader may desire to command the tag to execute any operation that the tag is capable of, such any command/operation as described elsewhere herein, or otherwise known.

In step 912, the command is executed.

Figure 9B:
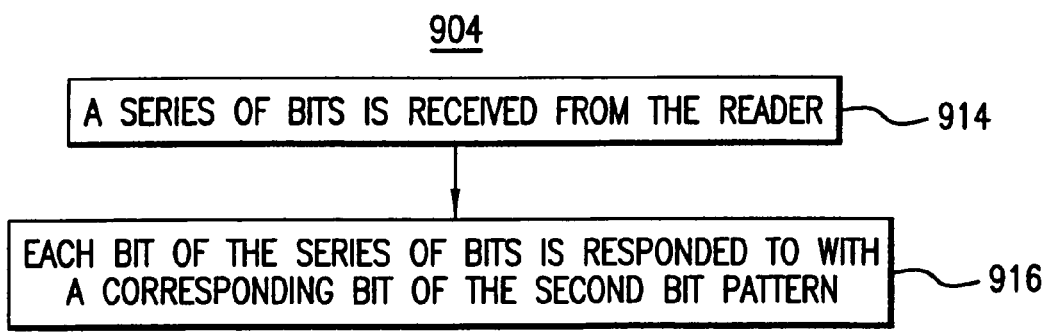

FIG. 9B shows example steps for step 904. As shown in the embodiment of FIG. 9B, step 904 can include steps 914 and 916.

In step 914, a series of bits is received from the reader. For example, as described above, the reader transmits bits to the tag.

In step 916, each bit of the series of bits is responded to with a corresponding bit of the second bit pattern. For example, the tag compares each received bit with the previous transmitted bit of the tag's second key (or in alternative embodiments, compares each received bit with the next bit of the tag's second key). If they match, the tag transmits the next bit of the second key.

In an embodiment, step 904 can include the step where the next bit of the second bit pattern is read from storage in the tag. For example, the storage can be second storage element 702 or 804, which stores the second key.

In another embodiment, step 904 can include the step where the next bit of the second bit pattern is randomly generated. For example, the bit values can be generated by a random bit pattern generator, such as random bit pattern generator 802 shown in FIG. 8. The generated bit values can be stored in storage 804, or alternatively, are not stored, but are immediately transmitted by the tag to the reader in response to the binary traversal operation. Thus, in a subsequent binary traversal operation, the tag would newly generate each bit of the second bit pattern.

Figure 10A:
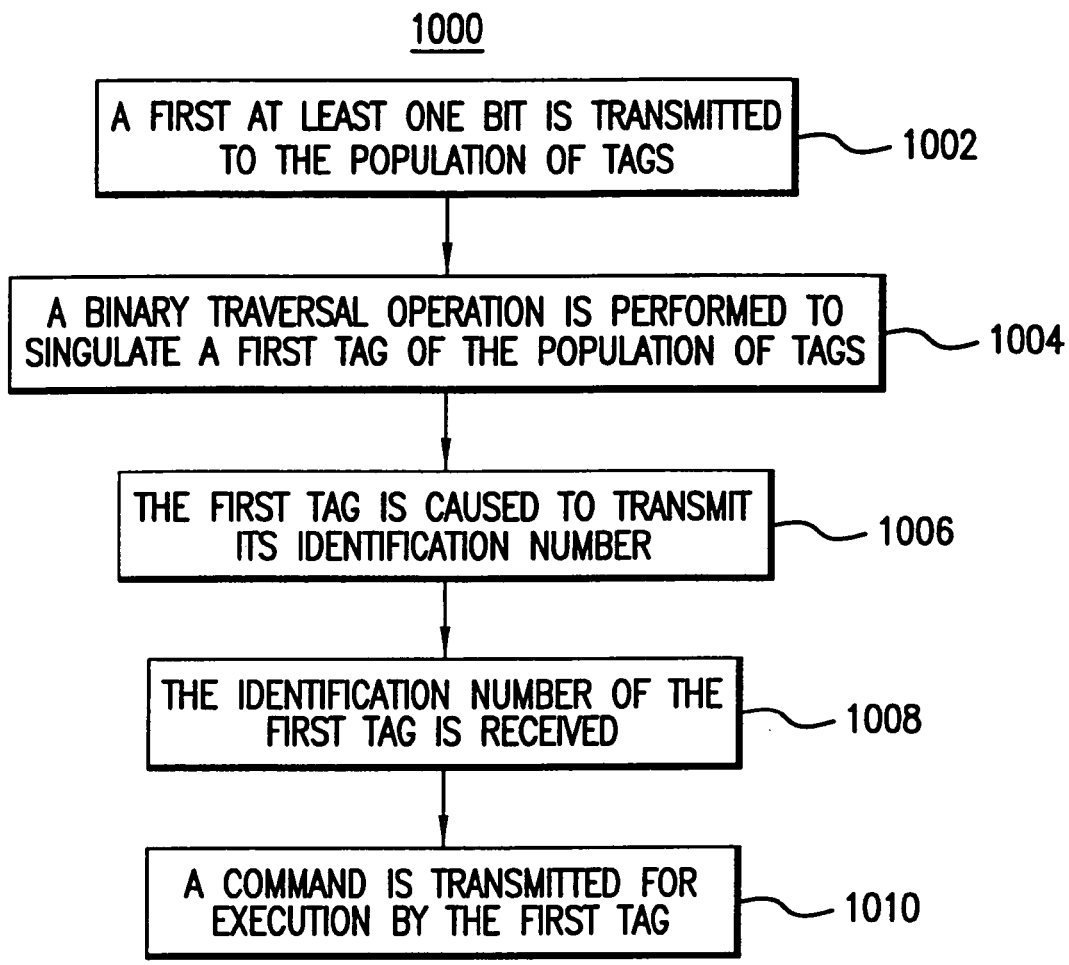
FIGS. 10A and 10B show flowcharts providing example steps for a reader to communicate with a population of RFID tags with improved security, using a second key, according to example embodiments of the present invention.

FIG. 10A shows a flowchart 1000 providing example steps for a reader to communicate with a population of RFID tags with improved security, according to an example embodiment of the present invention. In the example of flowchart 1000, each tag of the population of tags stores a corresponding identification number (i.e., a first key) which is defined by a first bit pattern. Other structural and operational embodiments will be apparent to persons skilled in the relevant art(s) based on the following discussion. The steps of FIG. 10A are described in detail below.

Flowchart 1000 begins with step 1002. In step 1002, a first at least one bit is transmitted to the population of tags to cause tags to respond to a binary traversal operation with a second bit pattern. The first at least one bit can be any bit or combination of bits to cause tags to respond with the second key.

In step 1004, a binary traversal operation is performed to singulate a first tag of the population of tags.

Steps 1006, 1008, and 1010 are optional, according to further example embodiments of the present invention.

In step 1006, the first tag is caused to transmit its identification number.

In step 1008, the identification number of the first tag is received.

In step 1010, a command is transmitted for execution by the first tag.

Figure 10B:
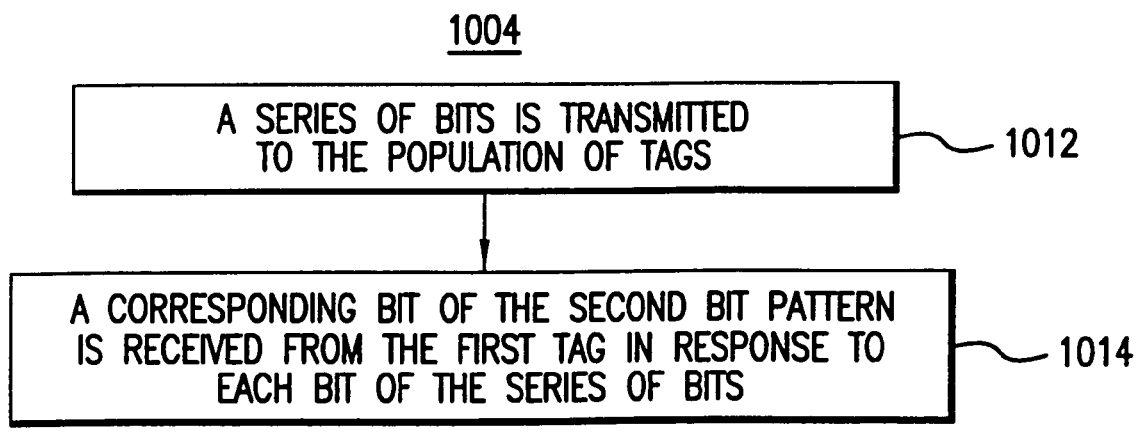

FIG. 10B shows example steps for step 904, according to an example embodiment of the present invention. As shown in the embodiment of FIG. 10B, step 1004 can include steps 1012 and 1014.

In step 1012, a series of bits is transmitted to the population of tags.

In step 1014, a corresponding bit of the second bit pattern is received from the first tag in response to each bit of the series of bits. Note that many tags of the population of tags may be responding to bits of the series of bits transmitted by the reader. However, eventually, only a single tag will respond, becoming the singulated tag.

In an embodiment, in step 1010, the reader transmits a predetermined number of bits. For example, the number of bits may be predetermined to be sufficient to identify tags within a communication range of the reader. For example, as described above, to negotiate 1024 tags, 10 bits are required for uniqueness. Thus, the reader may transmit 10 or more bits in the series of bits. Note that in embodiments, however, there is no limit on the number of bits a reader may transmit in the series of bits, including in the 1s, 10s, 100s, and 1000s of bits, to singulate a tag.

For example, in the example where the tag population includes 1024 tags, 16 bits may be chosen as the length of the second key for the tags. Thus, in this example, the reader could transmit 16 bits to likely singulate a tag. However, in this example, the reader could transmit fewer than 16 bits if it is predetermined that fewer than 16 bits will identify a single tag within communication range. Alternatively, the reader may desire to transmit bits additional to 16 bits to singulate a tag, in embodiments where tags are configured to have flexible bit lengths for the second key.

Further Embodiments

The systems and methods described above for improved security during RFID negotiations can be combined in any manner, as desired for a particular application. For example, in an embodiment, a reader may negotiate a population of tags. The tags may be instructed by the reader to respond with a second bit pattern during the negotiation that is not correlated with their identification number (e.g., their EPC number). The reader may negotiate the population of tags using a binary traversal. Once the reader singulates a tag, the reader can use the implied scroll function to cause the tag to send its identification number to the reader. Thus, this embodiment provides enhanced security because a non-correlated number is negotiated, and because the tag identification number is sent to the reader on the "backward" link, which is lower power. Furthermore, such a singulation of a tag, and receipt of the tag's identification number can occur very rapidly. Because during the implied scroll, a reader does not transmit edges, and therefore the tag does not have to wait for edges, the identification number of the tag can be scrolled to the reader very rapidly. For instance, in an example embodiment, the tag can transmit its identification number (or other information) during an implied scroll three times faster than communications can occur during a binary traversal.

Further combinations of the embodiments described herein are also within the scope and spirit of the present invention, as would be understood by persons skilled in the relevant art(s) from the teachings herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for a radio frequency identification (RFID) tag to communicate with a RFID reader, wherein the tag stores a corresponding identification number, wherein the identification number comprises a first bit pattern, comprising:
    (a) receiving a first at least one bit from the reader to cause the tag to respond to a communication operation with a second bit pattern;
    (b) engaging in a communications operation with the reader, including the steps of:
        (1) receiving a series of bits from the reader, and
        (2) responding to each bit of the series of bits with a corresponding bit of the second bit pattern.

2. The method of claim 1, wherein step (b) comprises: reading the second bit pattern from storage in the tag.

3. The method of claim 1, wherein step (b) comprises: randomly generating a bit value for each bit of the second bit pattern.

4. The method of claim 3, further comprising:
    (c) storing the second bit pattern.

5. The method of claim 4, further comprising:
    (d) engaging in a second communications operation with the reader, including the steps of:
        (1) receiving a second series of bits from the reader, and
        (2) responding to each bit of the series of bits with a corresponding bit of the stored second bit pattern.

6. The method of claim 3, further comprising:
    (d) engaging in a second communications operation with the reader, including the steps of:
        (1) receiving a second series of bits from the reader, and
        (2) responding to each bit of the series of bits with a second randomly generated bit value.

7. The method of claim 1, further comprising:
    (c) receiving at least one bit from the reader to cause the first tag to transmit its identification number; and
    (d) transmitting the identification number.

8. The method of claim 1, further comprising:
    (c) receiving a command from the reader; and
    (d) executing the command.

9. A radio frequency identification (RFID) tag, comprising:
    an antenna;
    a modulator coupled to said antenna, wherein said modulator is configured to backscatter modulate bits received from said antenna with response bits;
    a first storage that stores a first bit pattern that defines an identification number; and
    a second storage that stores a second bit pattern that does not include bits identifying an item with which the RFID tag is associated;
    wherein a first bit combination received from a reader causes said tag to respond to a communications operation with the first bit pattern; and
    wherein a second bit combination received from the reader causes said tag to respond to a communications operation with the second bit pattern.

10. The RFID tag of claim 9, wherein said second bit pattern is a random bit pattern.

11. The RFID tag of claim 10, further comprising:
    a random bit pattern generator that generates said second bit pattern.

12. The RFID tag of claim 11, wherein said random bit pattern generator comprises an oscillator.

13. The RFID tag of claim 9, wherein said second bit pattern is non-correlated with said first bit pattern.

14. The RFID tag of claim 9, wherein said second bit pattern is a fixed bit pattern.

15. The RFID tag of claim 9, wherein said second bit pattern includes bits corresponding to a location on wafer for an integrated circuit chip of the RFID tag.

16. The RFID tag of claim 9, wherein said second bit pattern includes bits corresponding to a time stamp.

17. The RFID tag of claim 9, wherein said second bit pattern includes a portion of the first bit pattern.

18. The RFID tag of claim 9, wherein said second bit pattern includes hashed bits from the first bit pattern.

19. A method for a radio frequency identification (RFID) tag to communicate with a RFID reader, wherein the tag stores a corresponding identification number, comprising:
    (a) receiving a first at least one bit from the reader to cause the tag to respond to a communications operation with a key;
    (b) engaging in a communications operation with the reader, including the steps of:
        (1) receiving a series of bits from the reader, and
        (2) responding to each bit of the series of bits with a randomly generated bit of the key.

20. A radio frequency identification (RFID) tag, comprising:
    an antenna;
    a modulator coupled to said antenna, wherein said modulator is configured to backscatter modulate bits received from said antenna with response bits;
    a storage that stores a bit pattern that defines an identification number; and
    a random bit pattern generator that generates said second bit pattern;
    wherein a first bit combination received from a reader causes said tag to respond to a communications operation with the first bit pattern; and
    wherein a second bit combination received from the reader causes said tag to respond to a communications operation with bits generated by said random bit pattern generator.

21. A method for a radio frequency identification (RFID) reader to communicate with a population of RFID tags, wherein each tag stores a corresponding identification number, wherein the identification number comprises a first bit pattern, comprising:
    (a) transmitting a first at least one bit to the population of tags to cause tags to respond to a communications operation with a second bit pattern;
    (b) performing a communications operation to singulate a first tag of the population of tags, including the step of:
        (1) transmitting a series of bits to the population of tags, and
        (2) receiving a corresponding bit of the second bit pattern from the first tag in response to each bit of the series of bits.

22. The method of claim 21, further comprising:
(c) after step (b), causing the first tag to transmit its identification number.

23. The method of claim 21, further comprising:
(c) after step (b), transmitting a command for execution by the first tag.

24. The method of claim 21, wherein the series of bits includes a number of bits predetermined to be sufficient to identify tags within a communication range of the reader, wherein step (1) comprises:
transmitting the predetermined number of bits to the population of tags.

25. A method in a radio frequency identification (RFID) system that includes at least one RFID reader that communicates with a population of RFID tags, wherein each RFID tag stores a corresponding identification number, comprising:
generating a key to identify an RFID tag of the population of RFID tags, wherein the key does not include bits identifying an item with which the RFID tag is associated;
operating an interrogation protocol to at least identify the RFID tag in the population of RFIDs tags; and
receiving bits of the generated key from the RFID tag during the interrogation protocol.

26. The method of claim 25, wherein said generating step includes the step of:
selecting a number from a sequence of numbers to use as the key.

27. The method of claim 25, wherein said generating step includes the step of:
using a randomly generated number as the key.

28. The method of claim 25, wherein said generating step includes the step of:
dynamically generating a number prior to each traversal of the population of RFID tags to use as the key.

29. A method for a radio frequency identification (RFID) reader to communicate with a population of RFID tags, wherein each tag stores a corresponding identification number, wherein the identification number includes a first bit pattern, comprising:
(a) transmitting a first at least one bit to the population of tags to cause tags to respond to a communications operation with a second bit pattern;
(b) performing a communications operation to singulate a first tag of the population of tags;
(c) transmitting a substantially constant signal to the population of tags; and
(d) receiving a plurality of bits of the first bit pattern from the first tag during transmission of the substantially constant signal.

30. The method of claim 29, further comprising:
(e) terminating transmission of the substantially constant signal to the population of tags to stop the first tag from transmitting further bits of the first bit pattern.

31. The method of claim 30, further comprising:
(f) transmitting a second substantially constant signal to the population of tags;
(g) receiving a second plurality of bits of the first bit pattern from the first tag during transmission of the second substantially constant signal; and
(h) terminating transmission of the second substantially constant signal to the population of tags to stop the first tag from transmitting further bits of the first bit pattern.

32. The method of claim 31, further comprising:
(i) repeating steps (f)-(h) for subsequent substantially constant signals.

33. A method for a radio frequency identification (RFID) reader to communicate with a population of RFID tags, wherein each tag stores a corresponding identification number, wherein the identification number includes a first bit pattern, comprising:
(a) transmitting a first at least one bit to the population of tags to cause tags to respond to an interrogation operation with the first bit pattern;
(b) transmitting a substantially constant signal to the population of tags; and
(c) receiving a plurality of bits of the first bit pattern from a first tag during transmission of the substantially constant signal.

34. The method of claim 33, further comprising:
(d) terminating transmission of the substantially constant signal to the population of tags to stop the first tag from transmitting further bits of the first bit pattern.

35. A method for a radio frequency identification (RFID) tag to communicate with a RFID reader, wherein the tag stores a corresponding identification number, wherein the identification number comprises a first bit pattern, comprising:
(a) randomly generating a second bit pattern;
(b) receiving a symbol from the reader to cause the tag to respond with the second bit pattern; and
(c) responding to the symbol with the second bit pattern.

36. The method of claim 35, wherein the symbol received from the reader comprises at least one bit.

37. The method of claim 35, further comprising:
(4) storing the second bit pattern.

38. The method of claim 37, wherein step (b) comprises:
reading the second bit pattern from storage in the tag.

39. The method of claim 35, further comprising:
(d) receiving a second symbol from the reader to cause the first tag to transmit the first bit pattern; and
(e) transmitting the first bit pattern.

40. The method of claim 35, further comprising:
(d) receiving a command from the reader; and
(e) executing the command.

41. The method of claim 35, wherein step (a) comprises:
randomly generating the second bit pattern as a pseudo-random number.

42. The method of claim 35, wherein step (a) comprises:
dynamically generating the second bit pattern.

43. The method of claim 35, wherein step (a) comprises:
randomly generating the second bit pattern to be a 16-bit length pattern.

44. A radio frequency identification (RFID) tag, comprising:
an antenna;
a modulator coupled to said antenna, wherein said modulator is configured to backscatter modulate bits received from said antenna with response bits;
a first storage that stores a first bit pattern that defines an identification number; and
a second storage that stores a second bit pattern that does not include bits identifying an item with which the RFID tag is associated;
wherein a first symbol received from a reader causes said tag to respond with the first bit pattern; and
wherein a second symbol received from the reader causes said tag to respond with the second bit pattern.

45. The RFID tag of claim 44, wherein said second bit pattern is a random bit pattern.

46. The RFID tag of claim 45, further comprising:
a random bit pattern generator that generates said second bit pattern.

47. The RFID tag of claim 45, wherein the first and second symbols each comprise at least one bit.

48. The RFID tag of claim 44, wherein the second bit pattern is a pseudo-random number.

49. The RFID tag of claim 44, wherein the second bit pattern is dynamically generated.

50. The RFID tag of claim 44, wherein the second bit pattern is a 16-bit length pattern.

* * * * *

UNITED STATES PATENT AND TRADEMARK OFFICE
CERTIFICATE OF CORRECTION

PATENT NO. : 7,497,384 B2 Page 1 of 1
APPLICATION NO. : 11/270778
DATED : March 3, 2009
INVENTOR(S) : Powell et al.

It is certified that error appears in the above-identified patent and that said Letters Patent is hereby corrected as shown below:

IN THE SPECIFICATION

Column 9, Line 36, delete "O's," and insert -- 0's, --, therefor.

Signed and Sealed this

Twenty-fourth Day of August, 2010

David J. Kappos
*Director of the United States Patent and Trademark Office*